(12) United States Patent
Liang et al.

(10) Patent No.: US 6,820,982 B1
(45) Date of Patent: Nov. 23, 2004

(54) METHOD AND APPARATUS FOR FORMING AN IMAGE ON A CURVED DIFFUSIVE SURFACE

(75) Inventors: Rongguang Liang, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/465,503

(22) Filed: Jun. 19, 2003

(51) Int. Cl.$^7$ .................. G03B 21/14; G03B 21/26; G03B 21/28; G03B 21/00
(52) U.S. Cl. ............... 353/69; 353/37; 353/34; 353/122; 353/7
(58) Field of Search .................. 353/7, 8, 21, 13, 353/28, 30, 31, 37, 69, 70, 77, 98, 100, 102, 122; 359/464, 465, 472, 475–477, 707, 708, 741–743, 13–15, 629–634, 625, 637, 639

(56) References Cited

U.S. PATENT DOCUMENTS

| | | | | |
|---|---|---|---|---|
| 4,293,196 A | * | 10/1981 | Hilbert | 359/743 |
| 5,249,081 A | * | 9/1993 | Rogers | 359/633 |
| 5,801,889 A | * | 9/1998 | Meyers et al. | 359/743 |
| 6,416,181 B1 | | 7/2002 | Kessler et al. | |
| 6,522,474 B2 | | 2/2003 | Cobb et al. | |
| 6,755,532 B1 | * | 6/2004 | Cobb | 353/7 |

* cited by examiner

*Primary Examiner*—David Gray
*Assistant Examiner*—Andrew Sever
(74) *Attorney, Agent, or Firm*—Nelson Adrian Blish

(57) ABSTRACT

An apparatus for forming an image on a curved diffusive surface (32) comprises an image source (94) for providing image-bearing light along an axis, a relay lens (54) for directing the image-bearing light toward the curved diffusive surface (32), and, a field lens (120) for redirecting off-axis image-bearings light toward the center of curvature of the curved diffusive surface (32).

18 Claims, 12 Drawing Sheets

METHOD AND APPARATUS FOR FORMING AN IMAGE ON A CURVED DIFFUSIVE SURFACE

FIELD OF THE INVENTION

This invention generally relates to projection apparatus and more particularly relates to an apparatus and method for forming a curved intermediate image from a substantially flat image source.

BACKGROUND OF THE INVENTION

In conventional projection apparatus, an image, provided from an essentially flat image-forming surface, is projected onto an essentially flat display surface. In film-based projection, for example, light is transmitted through a flat piece of film for projection onto a flat movie screen. Digital image-forming devices, such as transmissive and reflective LCDs and digital micromirror devices (DMDs) similarly produce an image on a flat surface. This allows projection apparatus employing these devices to use output optics that are similar to the projection optics employed in film-based projectors.

A number of optical systems, however, form images using curved surfaces, particularly optical systems of the immersive type that are designed to provide a wide field of view. One example system of this type is disclosed in commonly assigned U.S. Pat. No. 6,416,181 (Kessler et al.) and U.S. Pat. No. 6,522,474 (Cobb et al.), both incorporated herein by reference, herein referred to as either the '181 or '474 patent. In an autostereoscopic imaging apparatus 10 as described in the '181 disclosure and as shown in FIG. 1, a curved mirror 24 is employed, in combination with a beamsplitter 16 for providing an autostereoscopic virtual image to a viewer 12 at left and right viewing pupils 14*l* and 14*r*. For each viewing pupil 14*l* and 14*r*, an image generation system 70 provides an initial intermediate curved image that is then projected through a ball lens assembly 30 in order to form a left or right intermediate curved image at a focal plane of curved mirror 24.

The monocentric optical apparatus of the '181 disclosure provides autostereoscopic imaging with large viewing pupils, a very wide field of view, and minimal aberration. In order to provide this type of imaging and take advantage of the inherent benefits of monocentric projection, the apparatus of the '181 disclosure, given its source image formed on a flat surface, must form an intermediate image having a suitable curvature. Referring to FIG. 2, there is shown, extracted from the more detailed description of the '181 disclosure, a portion of an image generation system 70 for providing an intermediate curved image 80 for projection, for either eye, in autostereoscopic imaging apparatus 10. Here, an image generator 74 provides a source image from an image source 94, where image source 94 has a flat surface, such as from a reflective LCD. A relay lens 54 directs light from image generator 74 onto a diffusing element 32, so that a curved intermediate image 76 is formed on a diffusive surface 40. Ball lens assembly 30, cooperating with beamsplitter 16, projects curved intermediate image 76 toward a front focal surface 22 of a curved mirror 24 to form intermediate curved image 80. Curved mirror 24 then provides a virtual image of intermediate curved image 80 at viewing pupil 14.

Using the overall arrangement of FIG. 2, image source 94 can be any of a number of image sources that emit light, such as a transmissive or reflective LCD spatia light modulators, a digital micromirror device (DMD) spatial light modulator, a CRT, or an OLED or PLED device, for example. Significantly, the image formed on image source 94 is substantially flat. There may be some slight curvature to this image, such as would be provided by a CRT; however, the arrangement of FIG. 2 works well when image source 94 is flat and shows how intermediate image 80 can be formed having the needed curvature. Since most image display devices form a flat image, there is, then, no need for modification to off-the-shelf display components with this arrangement.

As the '181 disclosure points out, forming an intermediate image on a diffusive surface helps to overcome limitations imposed by the LaGrange invariant. A product of the size of the emissive device and the numerical aperture, the LaGrange invariant determines output brightness and is an important consideration for matching the output of one optical system with the input of another. Use of the diffuser with the '181 apparatus is necessary because the image-forming device, typically a reflective LCD or other spatial light modulator, is a relatively small emissive device, measuring typically no more than about 1 inch square. Referring again to FIGS. 1 and 2 and to the '181 disclosure, in order to maximize the light output from image generator 74, it is necessary to provide a large angle of emitted light, using diffusing element 32, in order to adequately fill left and right viewing pupil 14*l* and 14*r*. Diffusive surface 40 is shaped to provide curved intermediate image 76 having the desired curvature for the projection optical system.

While use of a diffusing element 32 provides a workable solution for forming a curved image, there are some drawbacks to projecting an image onto a diffusive component. In order to understand drawbacks with particular impact upon autostereoscopic imaging apparatus 10, it is instructive to consider how ball lens assembly 30 operates. Referring to FIG. 3*a*, there is shown the concentric arrangement and optical behavior of a ball lens assembly 30 for directing light from a curved image 50. A central spherical lens 46 is disposed between meniscus lenses 42 and 44. Central spherical lens 46 and meniscus lenses 42 and 44 have indices of refraction and dispersion characteristics intended to minimize on-axis spherical and chromatic aberration, as is well known in the optical design arts. An aperture stop 48 defines a ball lens pupil 106 within ball lens assembly 30. Aperture stop 48 need not be a physical stop, but may alternately be implemented using optical effects such as total internal reflection. In terms of the optics path, aperture stop 48 serves to define an entrance pupil and an exit pupil for ball lens assembly 30.

In most embodiments, meniscus lenses 42 and 44 are selected to reduce image aberration and to optimize image quality for the projected image projected. It must be noted that ball lens assembly 30 could comprise any number of arrangements of support lenses surrounding central spherical lens 46. Surfaces of these support lenses, however many are employed, would share a common center of curvature with $C_{ball}$, the center of curvature of central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could simply comprise a single central spherical lens 46, without additional supporting refractive components.

In ideal operation, curved image 50 shares the same center of curvature $C_{ball}$ as ball lens assembly 30. When arranged in this fashion, light from any point on curved image 50 is imaged with minimal aberration, as is represented in FIG. 3a.

The inherent advantages of a ball lens can be exploited using a modified design that employs a partial ball lens segment, such as using an hemisphere combined with a folding mirror, as is shown in the cross-sectional ray diagram of FIG. 3b and described in the '474 patent. In FIG. 3b, a hemispheric lens assembly 60 comprises a hemispheric central lens 66, one or more optional meniscus lenses 42, and a reflective surface 62 along the meridional plane of the hemisphere. Reflective surface 62 may be formed over the full surface of the meridional plane or may be formed only along a portion of this surface. As shown in FIG. 3b, hemispheric lens assembly 60 forms, from curved image 50 as its object, a curved image 64, folding the optical path at the same time. This arrangement can have advantages, for example, where space for optical components is constrained.

Referring to FIG. 4, there are shown ray traces of principal rays for projected light from image generation system 70. Light along optical axis O is incident to diffusing element 32 at a normal angle. As the projected light becomes off-axis, the incident angle onto diffusing element 32 also changes. At the edge of the projected field, as shown at an off-axis ray 200, the incident angle varies significantly from normal. This has a number of undesirable effects, as is shown in FIGS. 5a and 5b. Both on-axis light, as shown in FIG. 5a, and off-axis light, as shown in FIG. 5b, strike diffusing element 32 and are spread over a wide range of angles. The problems of most interest include the following related behavior:

(i) Hot spot. As a comparison of the clusters of rays in FIGS. 5a and 5b suggests, a higher percentage of on-axis light is provided to ball lens assembly 30 than of off-axis light; the result is a hot spot along optical axis O. Solutions for minimizing this effect include mechanical dithering of diffusing element 32; however, this type of solution adds cost for dithering components and requires further design compensation for high-frequency vibration effects.

(ii) Only a fraction of off-axis light reaches central spherical lens 46 for projection. Other light may be scattered throughout the optical system, reducing contrast.

As FIGS. 5a and 5b show, providing diffused light over a wide angle is necessary in order to obtain at least some level of brightness from off-axis light. At the same time, however, wide angle diffusion reduces contrast due to stray light leakage. Thus, even given some amount of curvature, diffusing element 32 is constrained with respect to efficiency. The requirements for large angle diffusion add complexity and cost to the design of diffusing element 32. Thus, although the use of curved diffusing element 32 helps to surmount LaGrange invariant limitations, there is still room for improvement in contrast and brightness and a need to minimize or eliminate any hot spot effects. Of particular value would be methods that provide these performance improvements at low cost and with minimum complexity.

Thus, it can be seen that there is a need for an imaging subsystem that provides, from a substantially flat image source, a curved image having high brightness as an intermediate image for projection and display apparatus.

SUMMARY OF THE INVENTION

It is an object of the present invention to provide an apparatus and method for forming a curved image from a substantially flat image source. With this object in mind, the present invention provides an apparatus for forming an image on a curved diffusive surface, comprising:

(a) an image source for providing image-bearing light along an optical axis;

(b) a relay lens for directing the image-bearing light toward the curved diffusive surface; and (c) a field lens for redirecting off-axis image-bearing light toward the center of curvature of the curved diffusive surface.

It is a feature of the present invention that it employs a field lens to redirect projected light towards a pupil, allowing subsequent protection of the image with its curvature preserved.

It is an advantage of the present invention that it provides improved contrast for an image projected onto a curved diffusive surface.

It is a further advantage of the present invention that it minimizes the characteristic hot spot along the optical axis that can result using conventional optical methods.

It is yet a further advantage of the present invention that it eases wide angle performance requirements of a curved diffusive surface.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

First Embodiment

Figure 4:
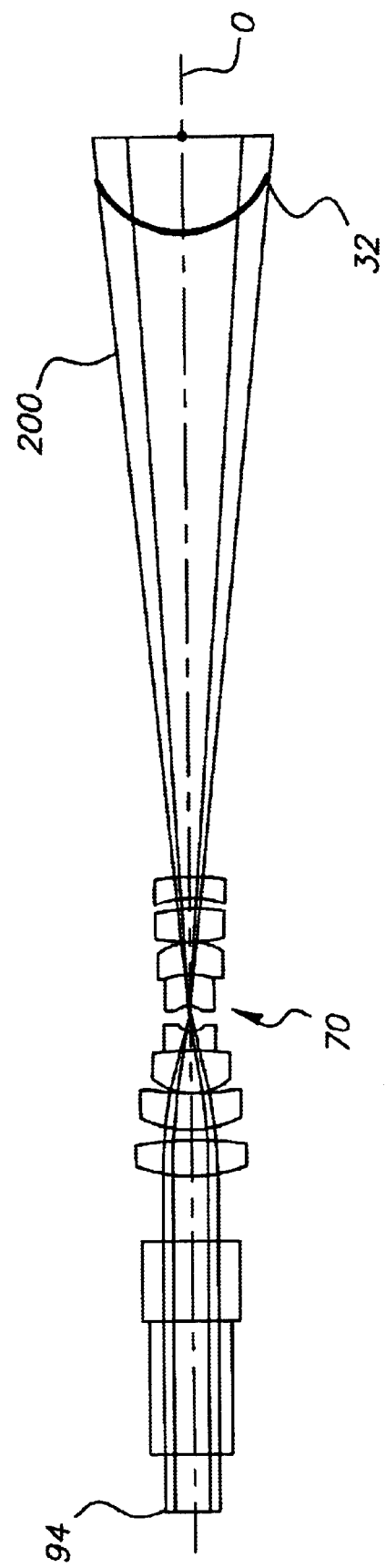
FIG. 4 is a side view diagram showing the path of principal rays projected onto a diffusive element.
Figure 5A:
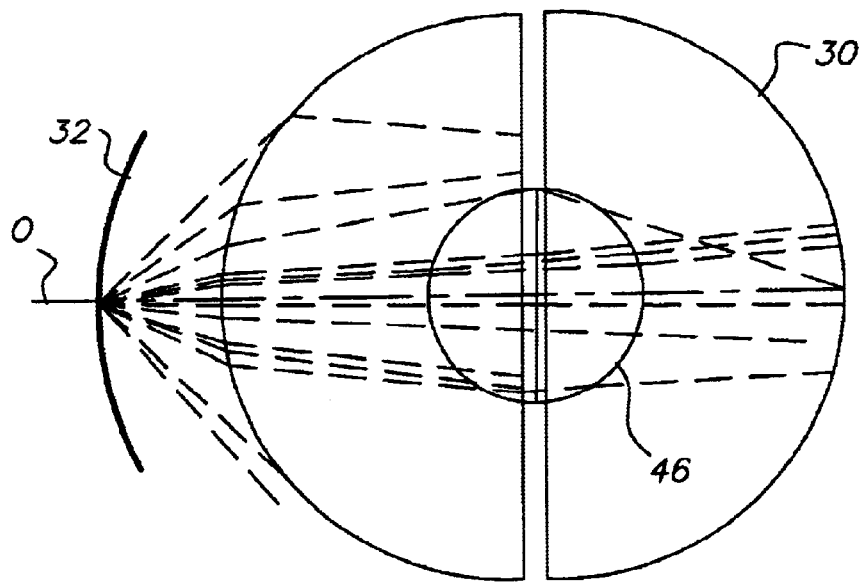
FIGS. 5a and 5b show wide angle rays directed for projection by a ball lens assembly, for on-axis and off-axis illumination, respectively.
Figure 5B:
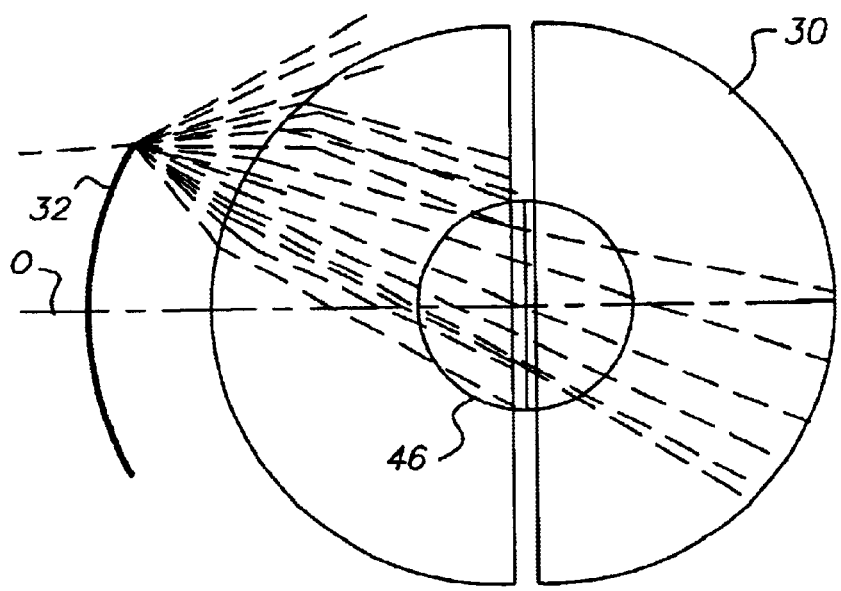
Figure 6:
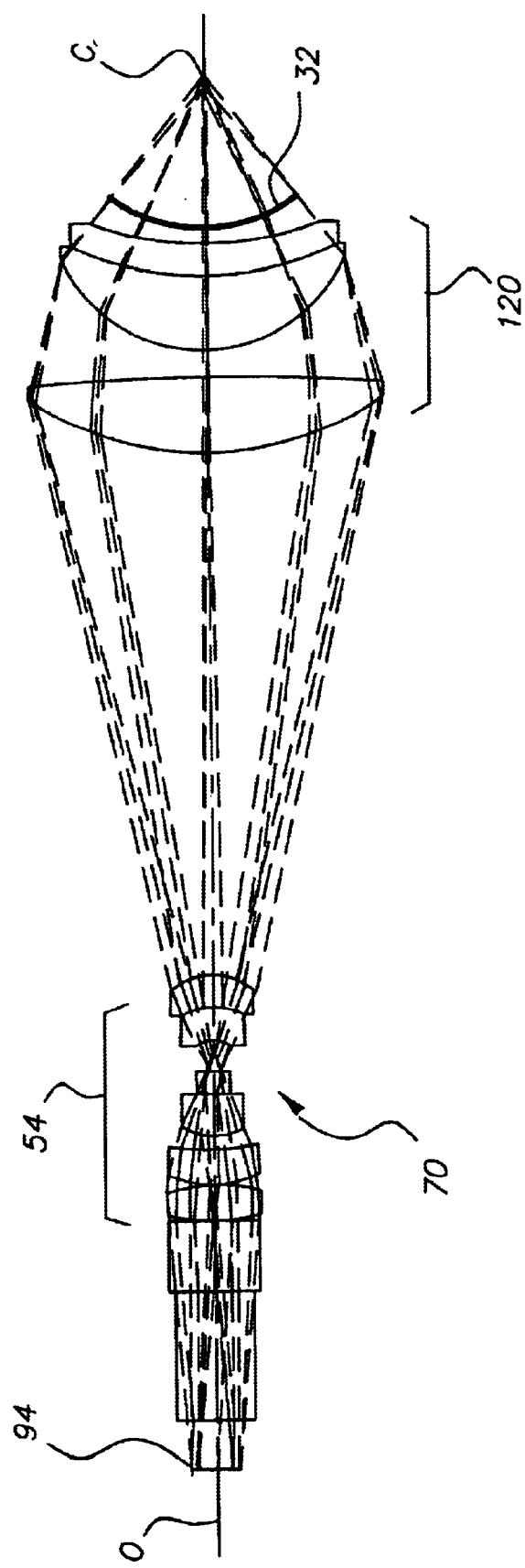
FIG. 6 is a side view diagram showing the path of projected rays directed by a field lens, in one embodiment of the present invention.
Figure 7A:
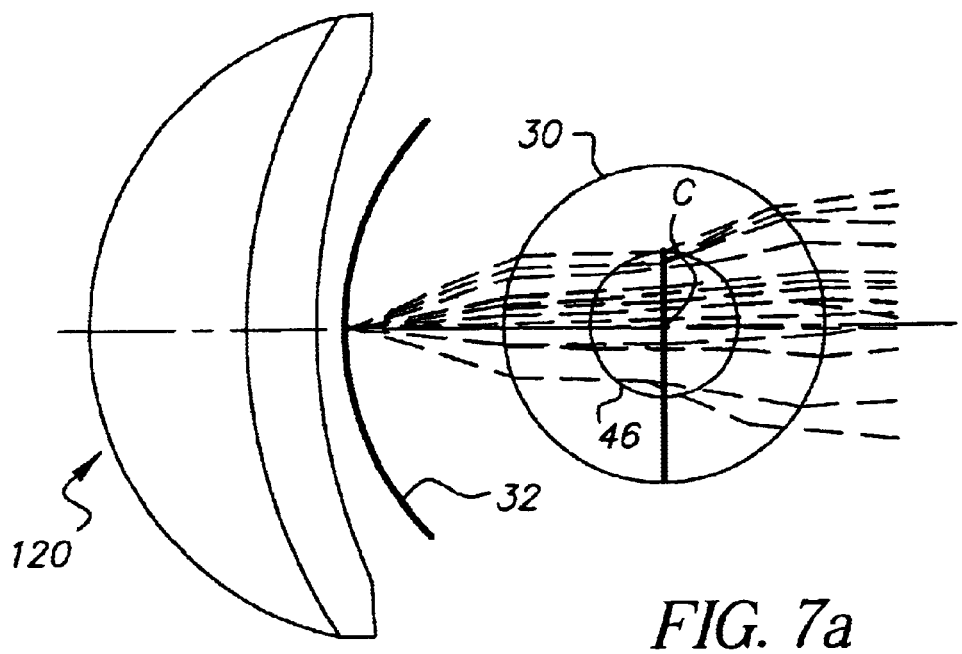
FIGS. 7a and 7b show narrower angle rays directed for projection by a ball lens assembly, for on-axis and off-axis illumination, respectively, using the apparatus of the present invention.
Figure 7B:
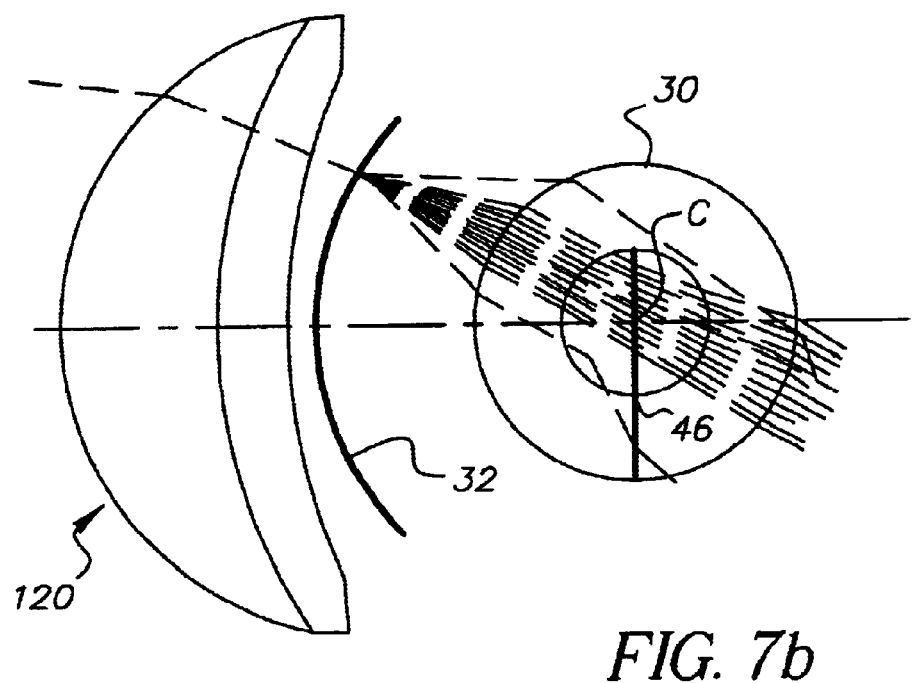

Referring to FIG. 6, there is shown a first embodiment of the present invention. Image source 94 provides light from its flat source image to relay lens 54 in image generation system 70. The light output from relay lens 54 fans outward from optical axis O. A field lens 120 redirects the off-axis light through diffusing element 32 toward the center of curvature C of diffusing element 32. In contrast with the prior art approach shown in FIG. 4, the optical arrangement of FIG. 6 directs off-axis rays at a normal to the surface of diffusing element 32, minimizing the optical effects that can cause hot spots, as was described hereinabove. Moreover, by directing the light towards the center of curvature C of diffusing element 32, field lens 120 provides an optimal arrangement for using ball lens assembly 30. Referring to FIGS. 7a and 7b, there are shown the paths of light rays for both on-axis and off-axis light incident on diffusing element 32. As can be seen by comparison with the prior art solution shown in FIGS. 5a and 5b, an arrangement using field lens 120 requires less angular spread of the incident light. For example, the prior art approach of FIGS. 4, 5a, and 5b typically requires a half-angle of diffusive light of about 30 degrees. In comparison, the use of field lens 120 as shown in FIGS. 6, 7a, and 7b reduces the needed half-angle of diffusive light to about 12 degrees.

As is shown in FIG. 6, field lens 120 may consist of a number of different lens elements. One or more of the component lenses of field lens 120 may be aspherical.

Second Embodiment

Figure 8:
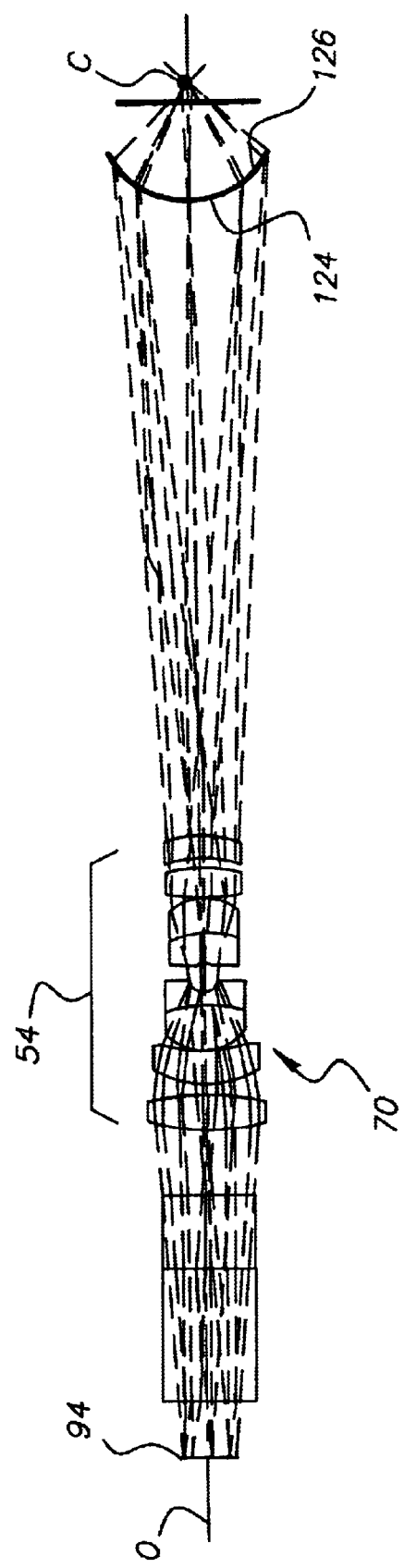
FIG. 8 is a side view diagram showing the path of projected rays directed by a field lens, in an alternate embodiment of the present invention.
Figure 9A:
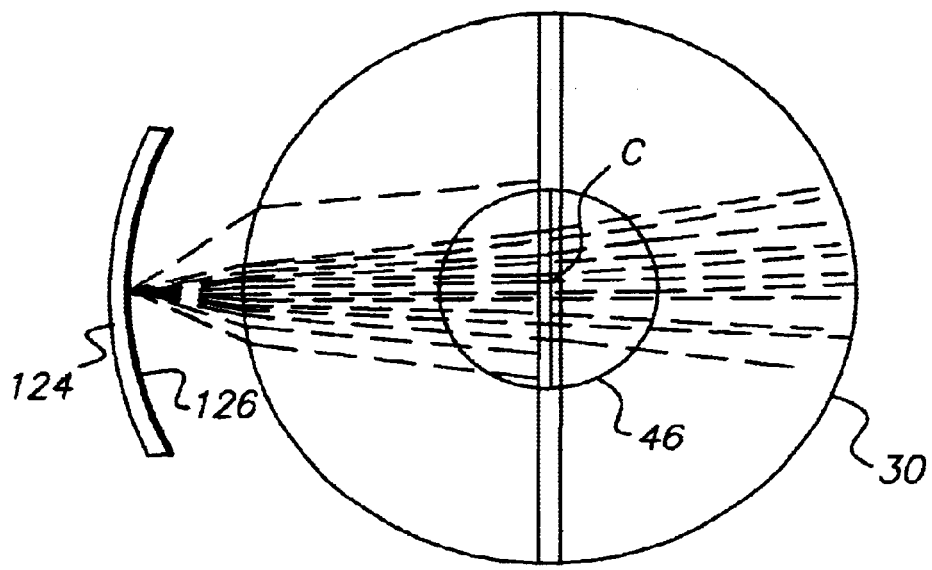
FIGS. 9a and 9b show narrower angle rays directed for projection by a ball lens assembly, for on-axis and off-axis illumination, respectively, using the curved Fresnel apparatus of the present invention.
Figure 9B:
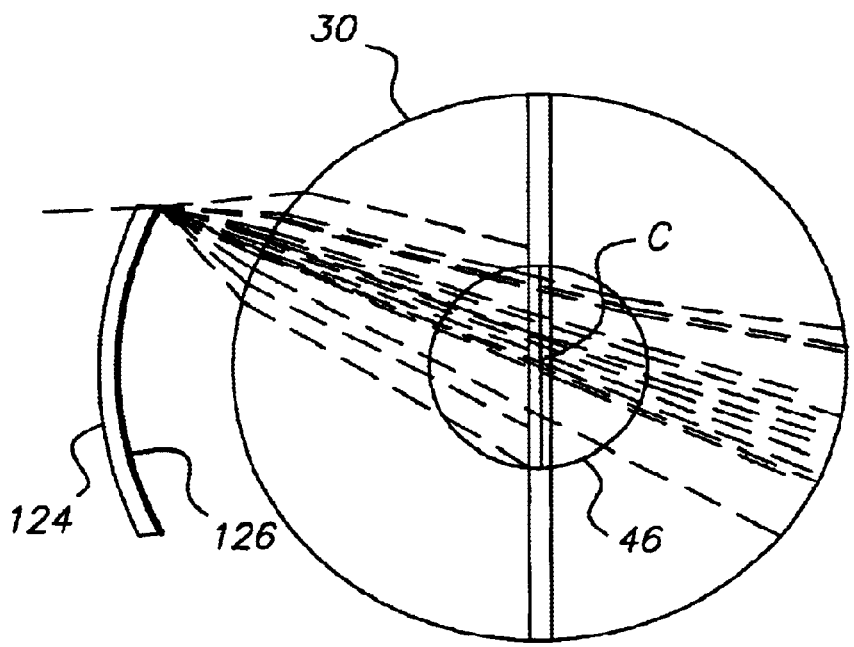

The embodiment of FIG. 6 employs conventional lens components as field lens 120. However, while there are advantages for system optical performance, the use of conventional glass or plastic optics can add bulk and weight to the overall imaging system. In response to the need to reduce size and weight, FIGS. 8, 9a, and 9b show an alternative embodiment using a curved Fresnel lens 124 and a diffusion film 126. Comparing the optical arrangement of FIG. 8 with that of FIG. 6, it can readily be seen that an embodiment using curved Fresnel lens 124 and diffusion film 126 would have advantages for reduced size and weight. FIGS. 9a and 9b show the angular spread of diffused light when using curved Fresnel lens 124 and diffusion film 126. Relative to overall performance and contrast, the conventional optics employed in the approach of FIG. 6 are slightly advantaged over the use of curved Fresnel lens 124 and diffusion film 126 in FIG. 8. However, for many applications, a slight performance compromise may be acceptable in consideration of the significant reduction in weight and size.

Figure 10:
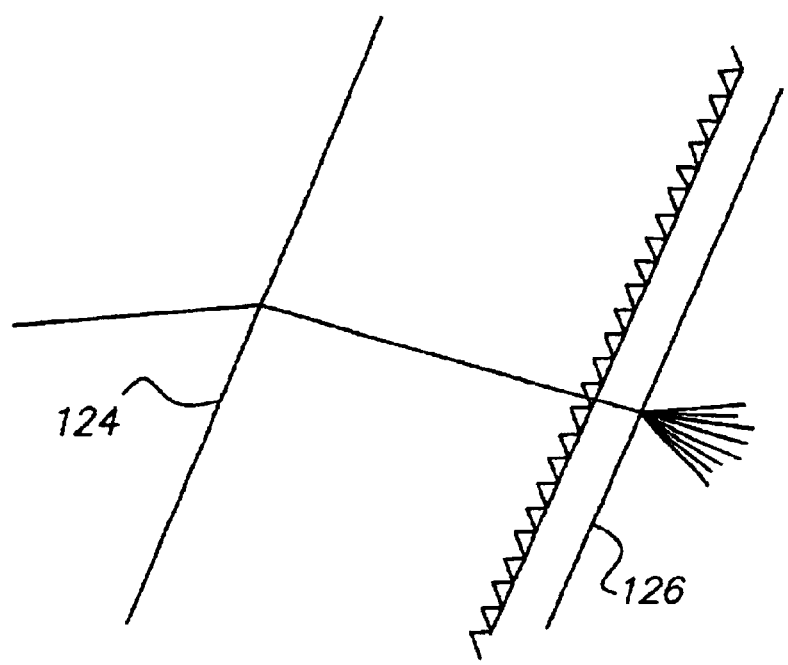
FIG. 10 shows a magnified side view using a Fresnel field lens and a diffuser sheet.

In practice, curved Fresnel lens 124 and diffusion film 126 can be packaged closely together, as is shown in the close-up side view of FIG. 10. A few microns of air-space might be provided between curved Fresnel lens 124 and diffusion film 126.

Custom optical suppliers provide Fresnel lens components in a range of types and shapes, including components having curved surfaces. A few examples of component suppliers are the following: Reflexite Display Optics, Rochester, N.Y. and Fresnel Technologies Inc., Fort Worth, Tex.

Diffusing element 32 is also curved and may be provided in a number of ways. For example, diffusing element 32 may be a fiber optic faceplate or a treated glass or plastic component, having a ground or chemically treated surface. Alternatively, holographic diffusive surfaces and diffusion films 126 could be used. Holographic diffusive surfaces and diffusion films are available from a number of suppliers, such as Reflexite Display Optics and Physical Optics Corporation, Torrance, Calif.

Embodiment within Autostereoscopic System

Figure 1:
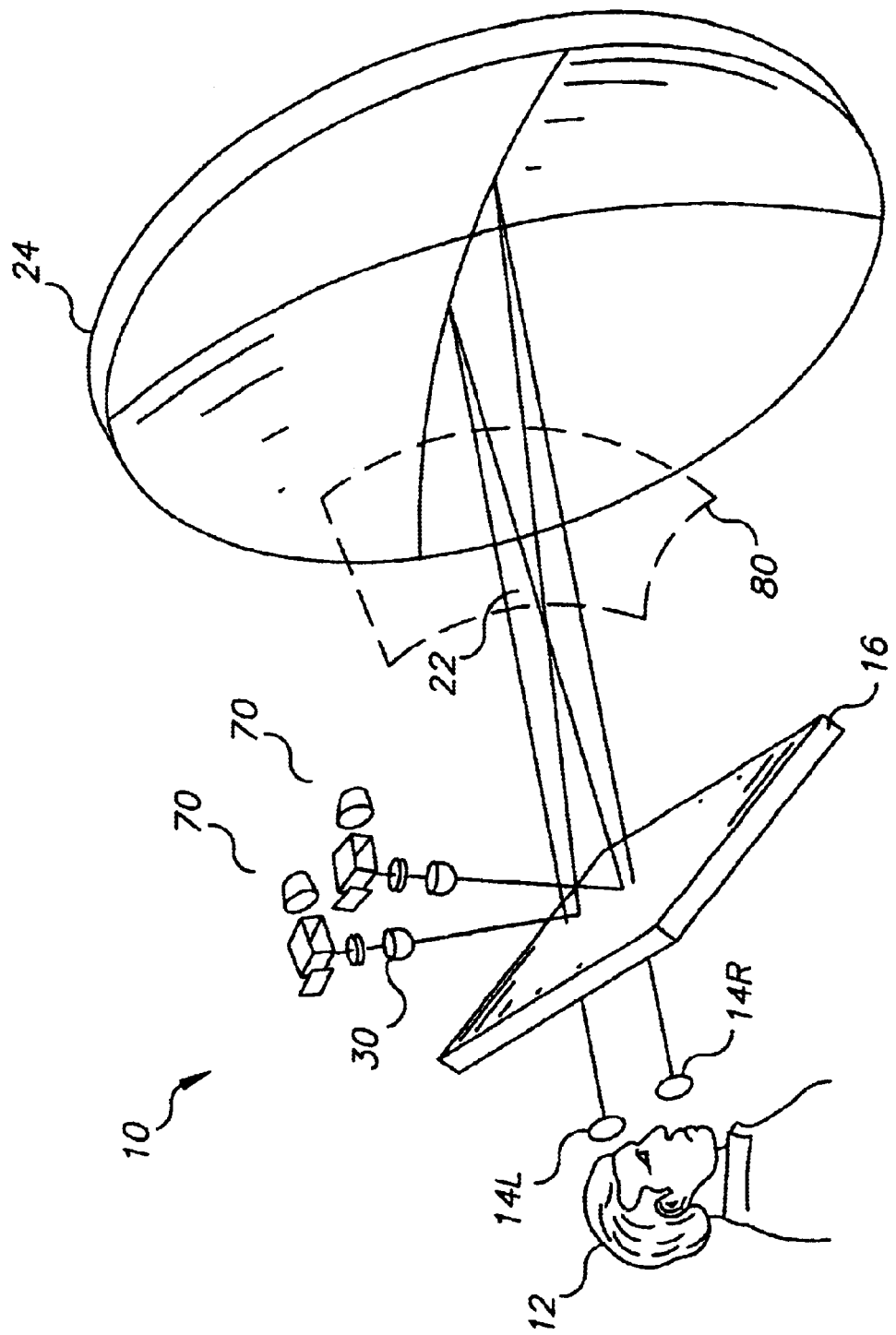
FIG. 1 is a perspective view showing an autostereoscopic optical apparatus that provides a curved image for projection.
Figure 2:
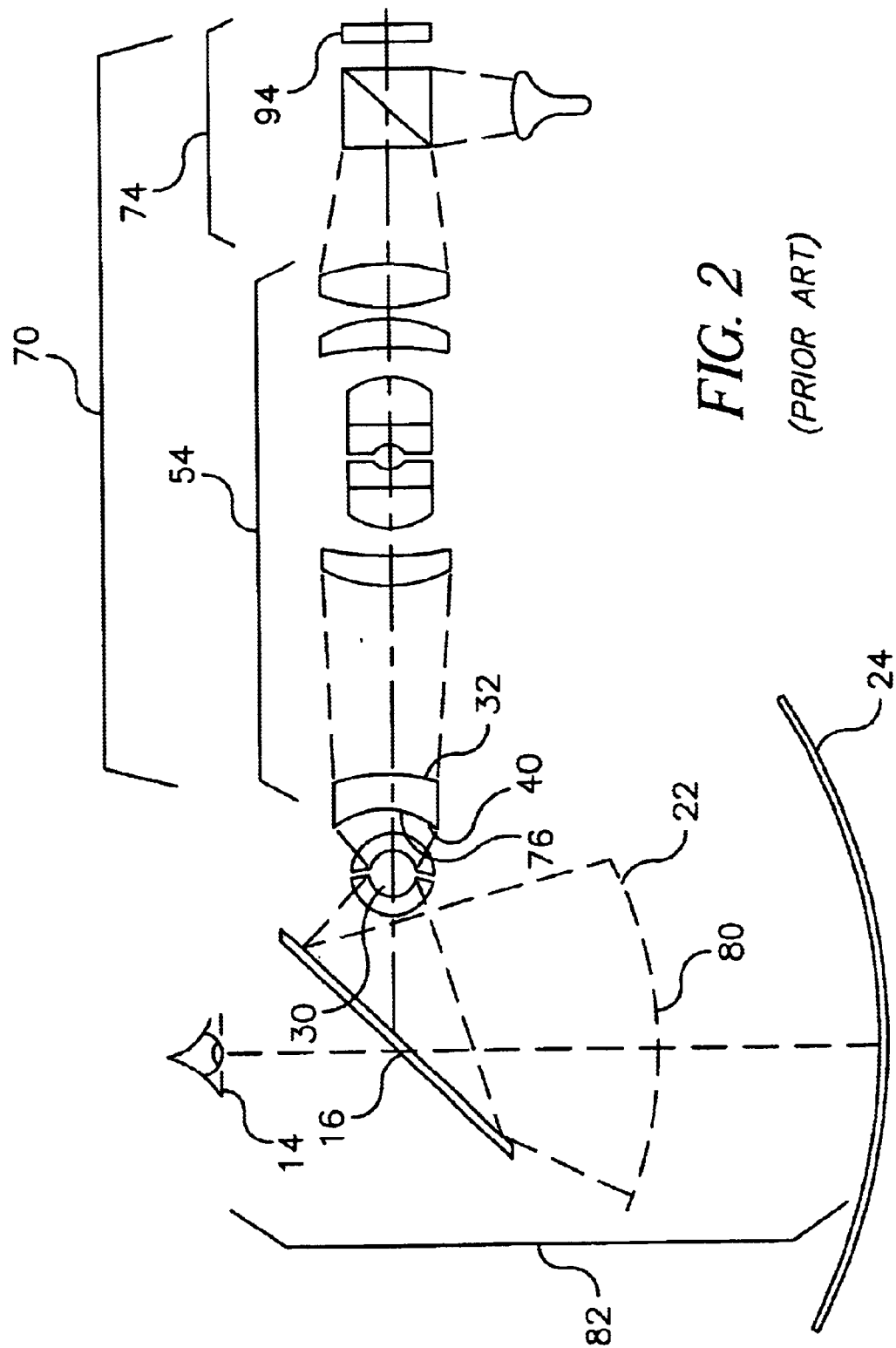
FIG. 2 is a schematic diagram showing a prior art arrangement of optical components for providing a curved image formed on a diffusive element and projected using a ball lens.
Figure 3A:
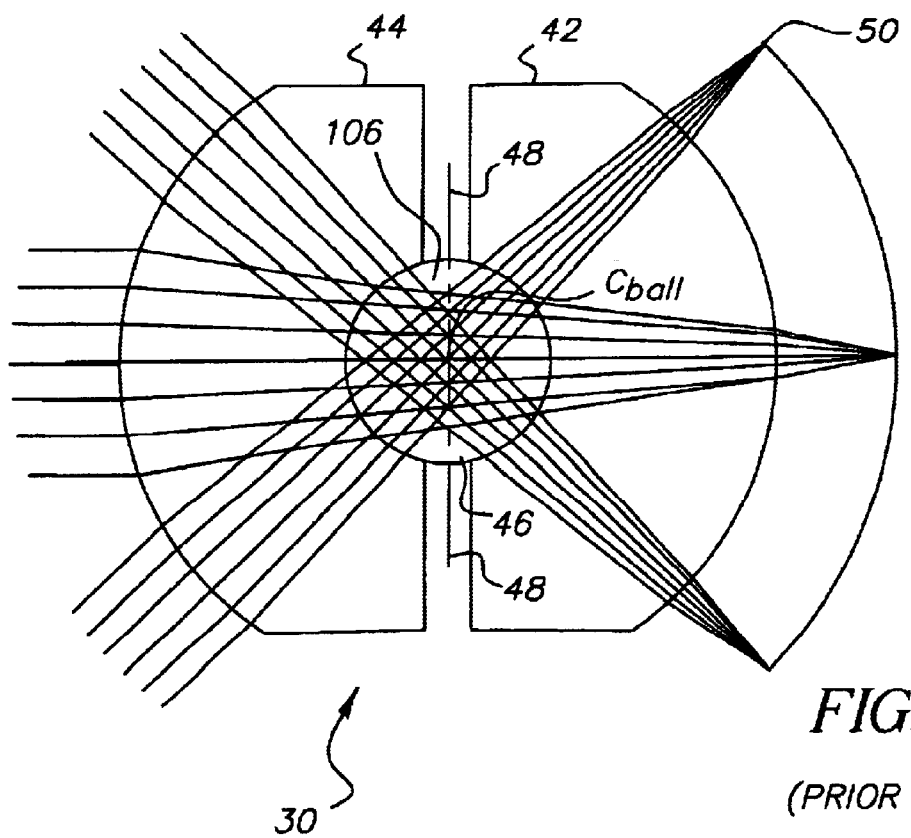
FIG. 3a is a cutaway side view showing components and overall optical behavior of a ball lens assembly.
Figure 3B:
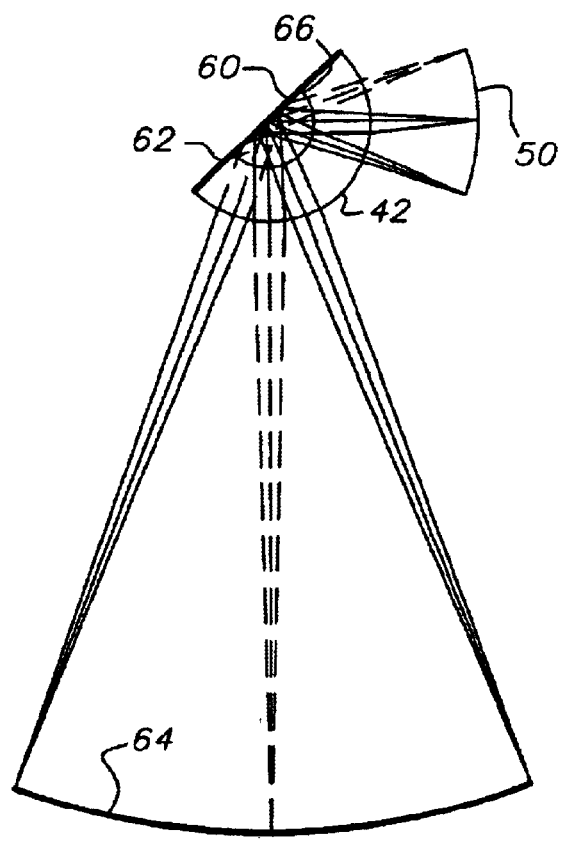
FIG. 3b is a cutaway side view showing components and optical behavior of an hemispheric lens having a reflective surface.
Figure 11:
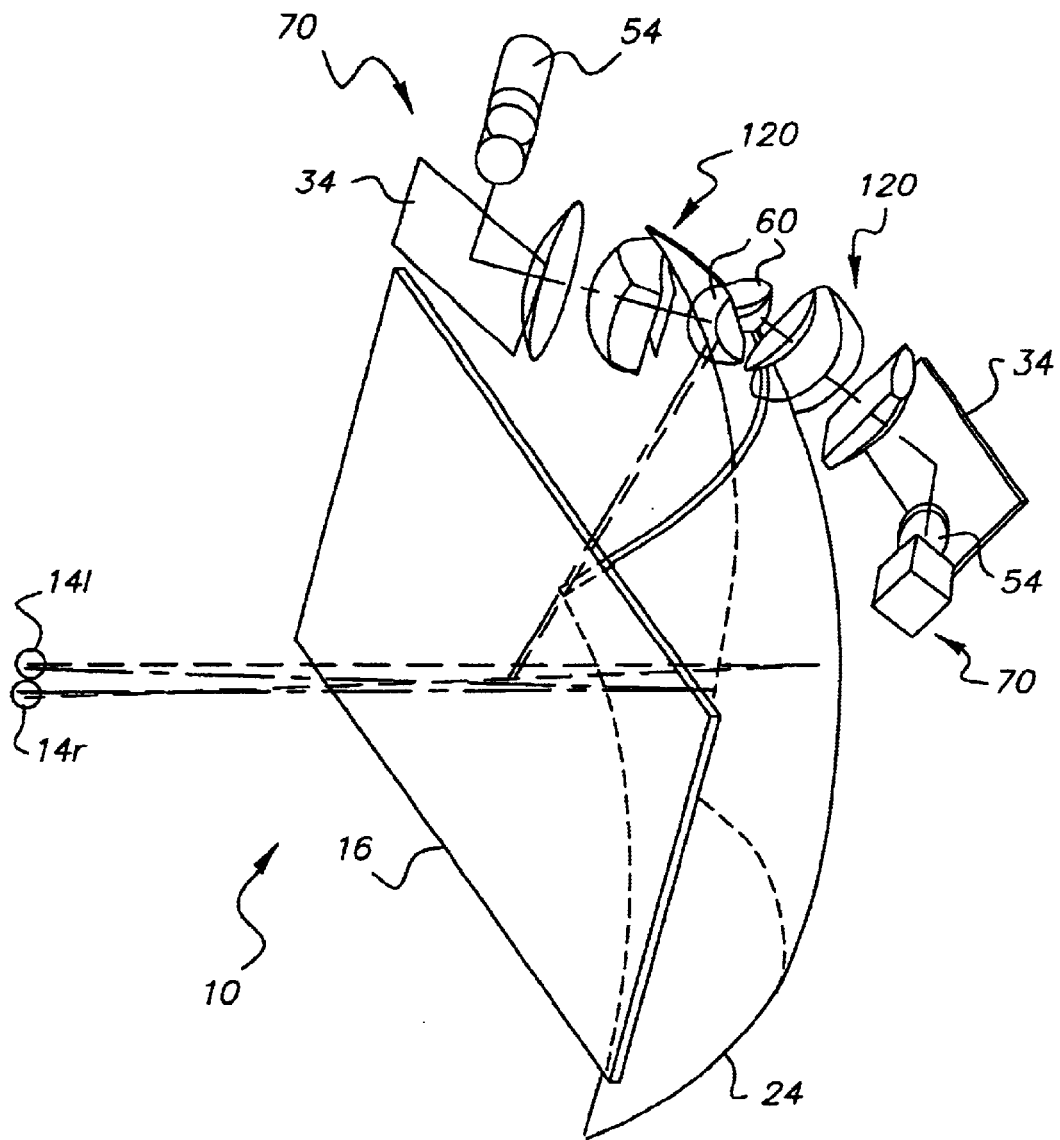
FIG. 11 shows a perspective view of a compact autostereoscopic imaging system employing the projection apparatus of the present invention using a pair of hemispheric lenses.

Referring to FIG. 11, there is shown a perspective view of autostereoscopic imaging apparatus 10 using image generation system 70 that employs field lens 120. For compact packaging, each image generation system 70 has a turning mirror 34 for providing modulated light from relay lens 54 to field lens 120. In the embodiment of FIG. 11, both left and right image paths employ a hemispheric lens assembly 60, as was shown in FIG. 3b.

Figure 12:
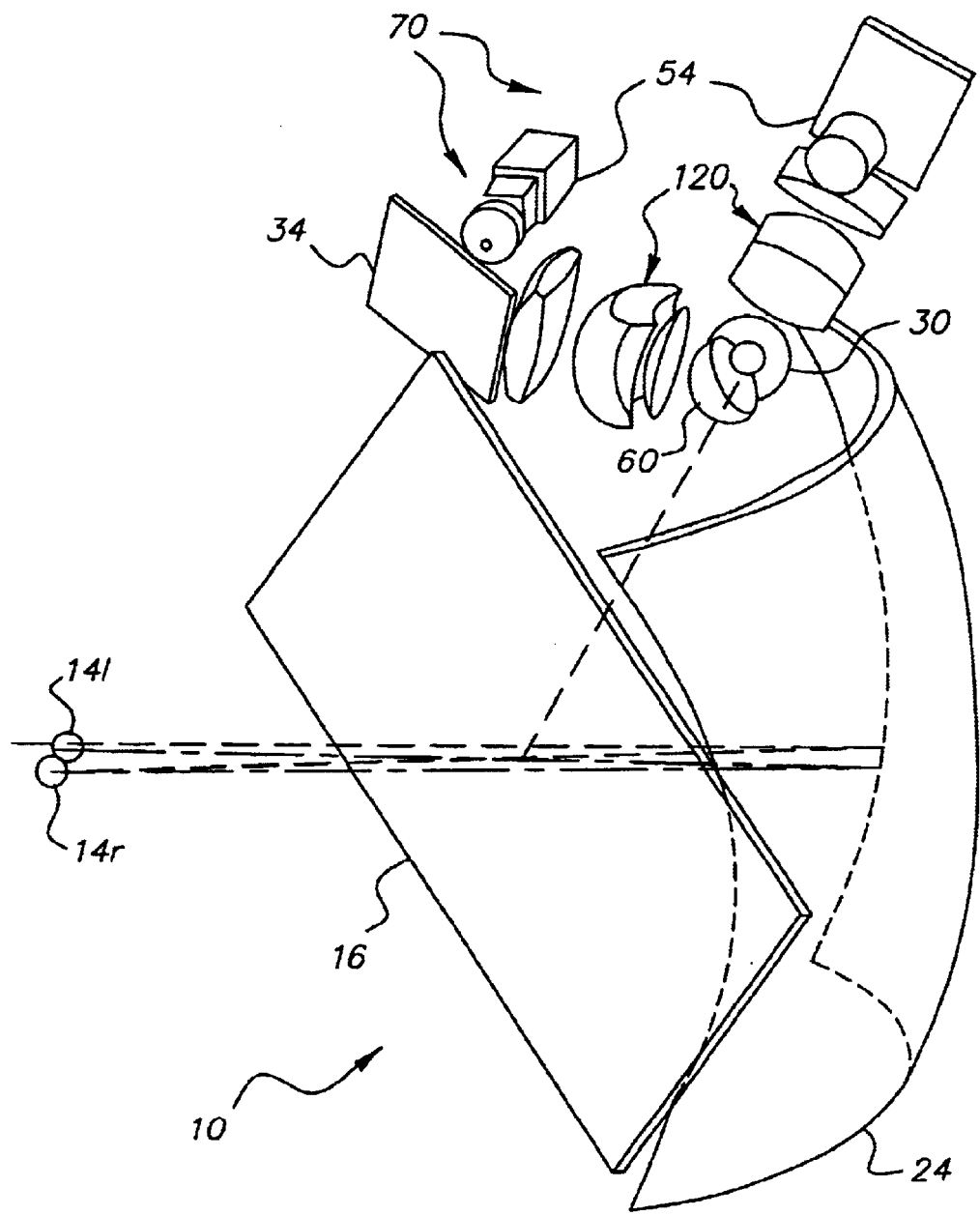
FIG. 12 shows a perspective view of a compact autostcreoscopic imaging system employing the projection apparatus of the present invention using one hemispheric lens paired with one spherical ball lens.

Referring to FIG. 12, an alternate embodiment for autostereoscopic imaging apparatus 10 is shown. In this arrangement, one image generation system 70 (for left viewing pupil 14l) uses a hemispheric lens assembly 60, the other image generation 70 (for right viewing pupil 14r) employs a spherical ball lens assembly 30. By pairing these two different types of ball lenses in a single system, the arrangement of FIG. 12 offers additional opportunities for compact packaging of autostereoscopic imaging apparatus 10.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any suitable field lens arrangement could be used for redirecting off-axis light toward center of curvature C of diffusing element 32.

Thus, what is provided is an apparatus and method for forming a curved image from a substantially flat image source and an autostereoscopic display using that apparatus.

PARTS LIST

10 Autostereoscopic imaging apparatus
12 Viewer
14 Viewing pupil
14l Viewing pupil, left
14r Viewing pupil, right
16 Beamsplitter
22 Front focal surface
24 Curved mirror
30 Ball lens assembly 32 Diffusing element
34 Turning mirror
40 Diffusive surface
42 Meniscus lens
44 Meniscus lens
46 Central spherical lens
48 Aperture stop
50 Curved image
54 Relay lens
60 Hemispheric lens assembly
62 Reflective surface
64 Curved image
66 Hemispheric central lens
70 Image generation system
74 Image generator
76 Intermediate image
80 Intermediate curved image
94 Image source
106 Ball lens pupil
120 Field lens
124 Curved Fresnel lens
126 Diffusion film
200 Off-axis ray

What is claimed is:

1. An apparatus for forming an image on a curved diffusive surface, comprising:
   (a) an image source for providing image-bearing light along an optical axis;
   (b) a relay lens for directing said image-bearing light toward the curved diffusive surface; and
   (c) a field lens for redirecting off-axis image-bearing light toward the center of curvature of the curved diffusive surface.

2. An apparatus for forming an image according to claim 1 wherein said image source is a spatial image modulator selected from the group consisting of a transmissive LCD, a reflective LCD, and a digital micromirror device.

3. An apparatus for forming an image according to claim 1 wherein the center of curvature of the curved diffusive surface is on said axis.

4. An apparatus for forming an image according to claim 1 wherein said field lens is a Fresnel lens.

5. An apparatus for forming an image according to claim 4 wherein said Fresnel lens is curved.

6. An apparatus for forming an image according to claim 1 wherein said field lens comprises an aspheric surface.

7. An apparatus for forming an image according to claim 1 wherein said curved diffusive surface is a holographic surface.

8. An apparatus for forming an image according to claim 1 wherein said curved diffusive surface comprises a treated glass surface.

9. An apparatus for forming an image according to claim 1 wherein said curved diffusive surface comprises a diffusion film.

10. An apparatus for forming a curved image, comprising:
    (a) an image source for providing image-bearing light along an axis;
    (b) a relay lens for directing said image-bearing light toward a curved diffusive surface; and
    (c) a field lens for redirecting off-axis image-bearing light toward the center of curvature of said curved diffusive surface.

11. An apparatus for forming an image according to claim 10 wherein said image source is a spatial image modulator selected from the group consisting of a transmissive LCD, a reflective LCD, and a digital micromirror device.

12. An apparatus for forming an image according to claim 10 wherein the center of curvature of the curved diffusive surface is on said axis.

13. An apparatus for forming an image according to claim 10 wherein said field lens is a Fresnel lens.

14. An apparatus for forming an image according to claim 13 wherein said Fresnel lens is curved.

15. An apparatus for forming an image according to claim 10 wherein said field lens comprises an aspheric surface.

16. An apparatus for forming an image according to claim 10 wherein said curved diffusive surface is a holographic surface.

17. An apparatus for forming an image according to claim 10 wherein said curved diffusive surface comprises a treated glass surface.

18. An apparatus for forming an image according to claim 10 wherein said curved diffusive surface is taken from the group consisting of a diffusion film and a fiber optic faceplate.

\* \* \* \* \*